US 8,208,685 B2

(12) United States Patent
Hamamura

(10) Patent No.: US 8,208,685 B2
(45) Date of Patent: Jun. 26, 2012

(54) WORD RECOGNITION METHOD AND WORD RECOGNITION PROGRAM

(75) Inventor: Tomoyuki Hamamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 999 days.

(21) Appl. No.: 12/184,456

(22) Filed: Aug. 1, 2008

(65) Prior Publication Data

US 2008/0292186 A1   Nov. 27, 2008

Related U.S. Application Data

(63) Continuation of application No. PCT/JP2008/053433, filed on Feb. 27, 2008.

(30) Foreign Application Priority Data

Mar. 14, 2007 (JP) ................................. 2007-065522

(51) Int. Cl.
*G06K 9/00* (2006.01)
(52) U.S. Cl. ......................................................... 382/101
(58) Field of Classification Search .................. 382/101, 382/187, 229
See application file for complete search history.

(56) References Cited

U.S. PATENT DOCUMENTS

| | | | | |
|---|---|---|---|---|
| 5,818,952 A | * | 10/1998 | Takenouchi et al. | 382/101 |
| 5,963,666 A | * | 10/1999 | Fujisaki et al. | 382/187 |
| 6,847,734 B2 | | 1/2005 | Hamamura | |
| 2007/0189613 A1 | * | 8/2007 | Tanaka | 382/229 |

FOREIGN PATENT DOCUMENTS

| | | |
|---|---|---|
| JP | 05-205109 | 8/1993 |
| JP | 06-111079 | 4/1994 |
| JP | 2001-283157 | 10/2001 |
| JP | 2008-097452 | 4/2008 |

OTHER PUBLICATIONS

"An Evaluation Function Based on a Posteriori Probability for Word Recognition"; Hamamura, Tomoyuki et al.; IEICE Technical Report, PRMU2006-92; Oct. 2006.
"A Word Matching Method Based on Bayes Estimation with Word Length Normalization"; Hamamura, Tomoyuki et al.; Meeting on Image Recognition and Understanding (MIRU2000); vol. II, pp. 1-6; Jul. 2000.

* cited by examiner

*Primary Examiner* — Claire X Wang
(74) *Attorney, Agent, or Firm* — Pillsbury Winthrop Shaw Pittman, LLP

(57) ABSTRACT

A word recognition method of performing recognition processing with respect to each word candidate obtained by reading characters in character information written in a reading material is provided. This word recognition method includes a matching processing step of collating each word candidate with a plurality of words in a word dictionary and calculating, every word, a matching score indicative of a degree that each word candidate matches with a word, a character quality score calculating step of calculating a character quality score indicative of a degree that a character candidate constituting each word candidate matches with an arbitrary character, and a correcting step of correcting a matching score obtained at the matching processing step based on a character quality score acquired at the character quality score calculating step.

4 Claims, 8 Drawing Sheets

FIG. 3
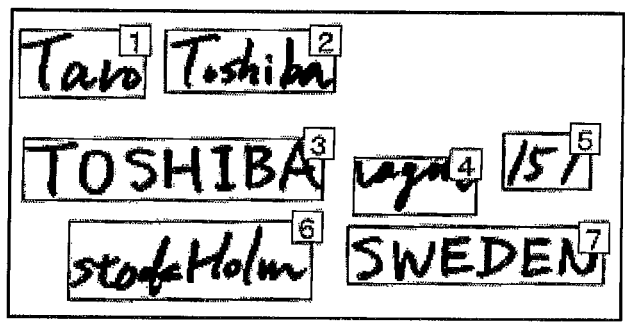
FIG. 4
FIG. 5

Word candidate number

| Word | | 1 | 2 | 3 | 4 | 5 | 6 | 7 |
|---|---|---|---|---|---|---|---|---|
| STOCKHOLM | 1 | -3 | 5 | 0 | 7 | -9 | (31) | 8 |
| TOCHICA | 2 | 8 | 25 | (39) | 1 | -8 | 4 | -1 |
| MOHEDA | 3 | 3 | -5 | 7 | 2 | -3 | 0 | 9 |
| ... | | | | a | | | b | |

FIG. 7

Word candidate number

| 1 | 2 | 3 | 4 | 5 | 6 | 7 |
|---|---|---|---|---|---|---|
| 12 | 11 | 20 | 1 | 12 | 5 | 23 |

FIG. 8

Word candidate number

| Word | | 1 | 2 | 3 | 4 | 5 | 6 | 7 |
|---|---|---|---|---|---|---|---|---|
| STOCKHOLM | 1 | -15 | -6 | -20 | 6 | -21 | (26) | -15 |
| TOCHICA | 2 | -4 | 14 | (19) | 0 | -20 | -1 | -24 |
| MOHEDA | 3 | -9 | -16 | -13 | 1 | -15 | -5 | -14 |
| ... | | | | a' | | | b' | |

FIG. 9

WORD RECOGNITION METHOD AND WORD RECOGNITION PROGRAM

CROSS-REFERENCE TO RELATED APPLICATIONS

This is a Continuation Application of PCT Application No. PCT/JP2008/053433, filed Feb. 27, 2008, which was published under PCT Article 21(2) in Japanese.

This application is based upon and claims the benefit of priority from prior Japanese Patent Application No. 2007-065522, filed Mar. 14, 2007, the entire contents of which are incorporated herein by reference.

BACKGROUND OF THE INVENTION

1. Field of the Invention

The present invention relates to a word recognition method of recognizing words and a word recognition program that is used to execute word recognition processing in, e.g., an optical character reading apparatus that optically reads a word including a plurality of characters written in, e.g., a reading material.

2. Description of the Related Art

For example, in an optical character reading apparatus, when reading a character written in a reading material, accurate reading can be generally performed by using knowledge of words even though an accuracy for recognizing each character is low. Various kinds of methods have been conventionally proposed as implementation methods.

Among others, there is a method disclosed in Jpn. Pat. Appln. KOKAI Publication No. 2001-283157 as a method of using a posteriori probability as an evaluation value for each word to enable accurate word recognition even if the number of characters is not fixed.

However, the method disclosed in the above-explained document is provided on the assumption that a position where a word is written is already known, and it cannot be said that word recognition can be performed with a sufficient accuracy when the position where the word is written is unknown. For example, when a correct word is disorderly written or an incorrect word is fairly written, an evaluation value (a matching score) of a word in a dictionary similar to the incorrect word rises, and erroneous recognition is thereby apt to be carried out.

BRIEF SUMMARY OF THE INVENTION

Therefore, it is an object of the present invention to provide a word recognition method and a word recognition program that can accurately perform word recognition even if a position where a word is written is unknown.

According to the present invention, there is provided a word recognition method of performing recognition processing with respect to each word candidate obtained by reading characters in character information written in a reading material, comprising: a matching processing step of collating each word candidate with a plurality of words in a word dictionary and calculating, every word, a matching score indicative of a degree that each word candidate matches with a word; a character quality score calculating step of calculating a character quality score indicative of a degree that a character candidate constituting each word candidate matches with an arbitrary character; and a correcting step of correcting a matching score obtained at the matching processing step based on a character quality score acquired at the character quality score calculating step.

According to the present invention, there is provided a word recognition program that allows a computer to perform recognition processing with respect to a word candidate obtained by reading characters in character information written in a reading material, comprising: a matching processing step of collating each word candidate with a plurality of words in a word dictionary and calculating, every word, a matching score indicative of a degree that each word candidate matches with a word; a character quality score calculating step of calculating a character quality score indicative of a degree that a character candidate constituting each word candidate matches with an arbitrary character; and a correcting step of correcting a matching score obtained at the matching processing step based on a character quality score acquired at the character quality score calculating step.

BRIEF DESCRIPTION OF THE SEVERAL VIEWS OF THE DRAWING

FIG. 3 is a view showing an example of an image of, e.g., a form in an alphabet-using countries fetched by, e.g., scanner;

FIG. 4 is a view showing an example of word candidates detected from a fetched image;

FIG. 5 is a view showing an example of a word dictionary having city name words registered therein;

FIG. 7 is a view showing an example of matching scores stored in a matching score table;

FIG. 8 is a view showing an example of character quality scores stored in a character quality score table;

FIG. 9 is a view showing an example of correction cores stored in a corrected score table;

DETAILED DESCRIPTION OF THE INVENTION

An embodiment according to the present invention will now be explained hereinafter with reference to the accompanying drawings.

Figure 1:
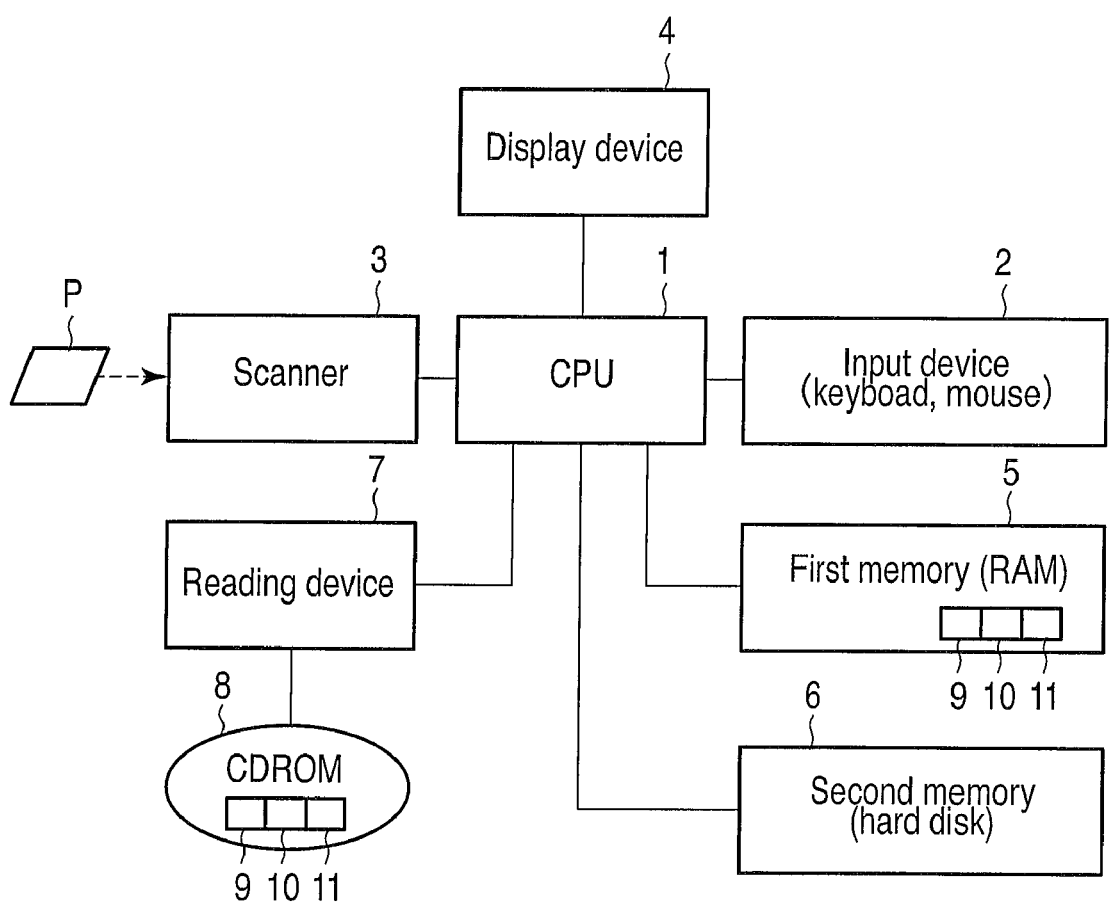
FIG. 1 is a block diagram schematically showing a structure of a word recognition system that realizes a word recognition method according to an embodiment of the present invention.

FIG. 1 schematically shows a structure of a word recognition system that realizes a word recognition method according to an embodiment of the present invention.

In FIG. 1, this word recognition system is formed of a CPU (a central processing unit) 1, an input device 2, a scanner 3 as image inputting means, a display device 4, a first memory 5 as storing means, a second memory 6 as storing means, a reading device 7, and others.

The CPU 1 executes an operating system program stored in the second memory 6 and an application program (e.g., a word recognition program) stored in the second memory 6 to perform, e.g., word recognition processing that will be explained later in detail.

The input device 2 is formed of, e.g., a keyboard, a mouse, and others, and utilized by a user to perform various kinds or operations or input various kinds of data.

The scanner 3 reads each character in a word written in a reading material based on optical scanning, and inputs the read character.

The display device 4 is formed of, e.g., a display device or a printer, and outputs various kinds of data.

The first memory 5 is formed of, e.g., an RAM (a random access memory), and utilized as a working memory for the CPU 1 to temporarily store various kinds of data that are being processed. For example, the first memory 5 temporarily stores, a character dictionary 9, a word dictionary 10, a probability table 11, and others which will be explained later.

The second memory 6 is formed of, e.g., a hard disk device, and stores various kinds of programs and others to operate the CPU 1. The second memory 6 stores an operating system program that is used to operate the input device 2, the scanner 3, the display device 4, the first memory 5, the second memory 6, the reading device 7, and others, a word recognition program, the character dictionary 9 for recognition of characters constituting each word, the word dictionary 10 for word recognition, the probability table 11 storing appearance probabilities of characters constituting each word, and others. The word dictionary 10 stores a plurality of candidates of words that should be recognized in advance, and it is a city name dictionary in which areas where the word recognition systems are installed, e.g., city names in states are registered.

The reading device 7 is formed of, e.g., a CD-ROM drive device and reads the word recognition program or the word dictionary 10 for word recognition stored (saved) in a CD-ROM 8 as a storage medium. The word recognition program, the character dictionary 9, the word dictionary 10, and the probability table 11 read by the reading device 7 are stored (saved) in the second memory 6.

Figure 2:
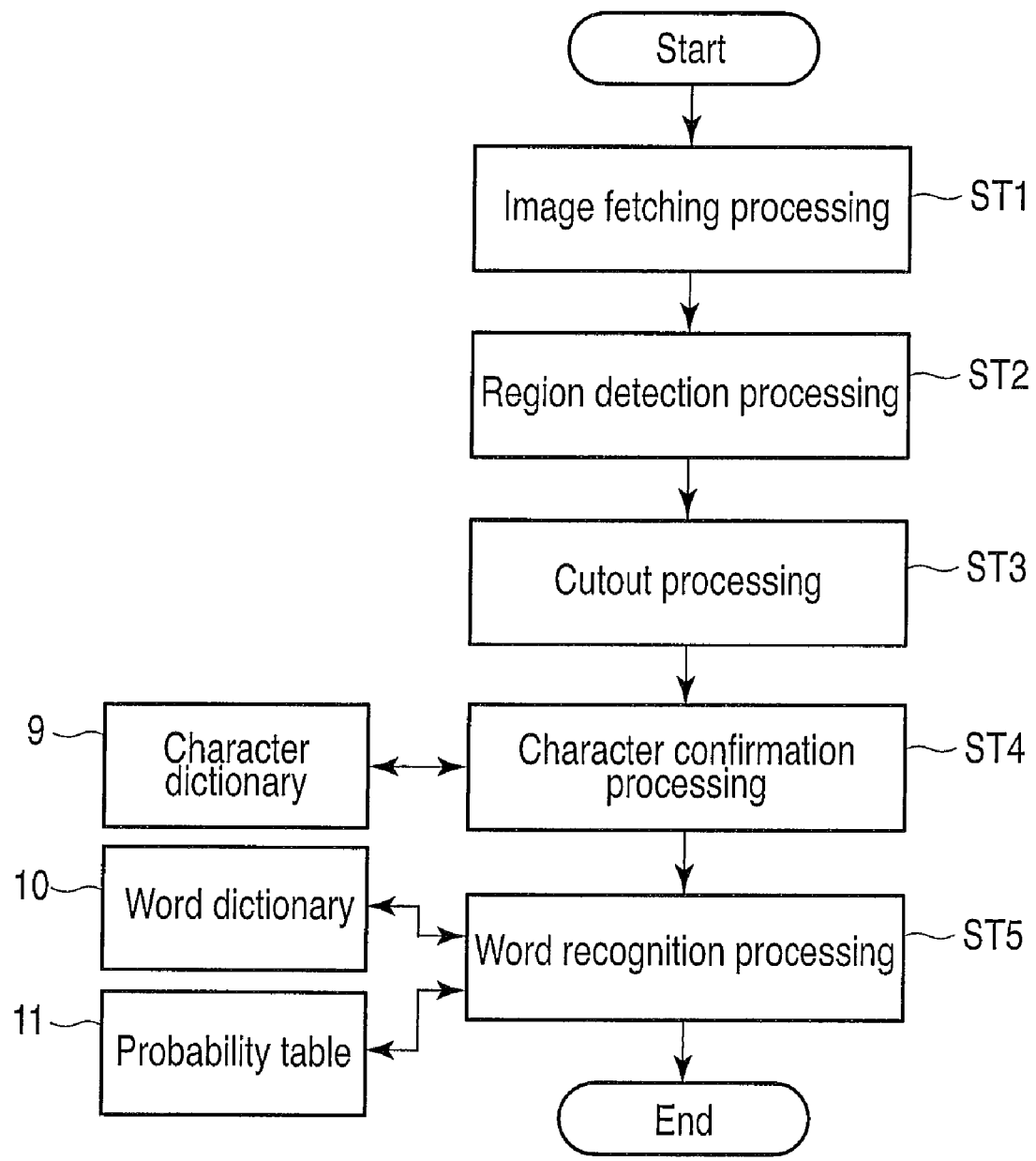
FIG. 2 is a flowchart for explaining an outline of the word recognition method.

An outline of the word recognition method will now be explained hereinafter with reference to a flowchart in FIG. 2.

First, image fetching processing of fetching (reading) an image in a postal matter P by the scanner 3 is carried out (step ST1). Region detection processing of detecting a region where an address is written based on the image fetched by this image fetching processing is performed (step ST2). Cutout processing of using vertical projection or horizontal projection to cut out a character pattern in a rectangular region in accordance with each character in a word corresponding to a city name from the address written region detected by this region detection processing is performed (step ST3). Character recognition processing of obtaining character recognition candidates based on a degree of similarity obtained by comparing the character pattern of each character in the word cut out by this cutout processing with a character pattern stored in the character dictionary 9 is effected (step ST4). Word recognition processing of calculating posteriori probabilities of respective city names in the word dictionary 10 and recognizing a city name having the highest posteriori probability as a word by using a recognition result of each word obtained by the character recognition processing, each character in the city names stored in the word dictionary 10, and the probability table 11 is carried out (step ST5). Each processing is controlled by the CPU 1.

A description will now be given as to an example of reading a city name from an address written in, e.g., a form in alphabet-using countries as a specific example.

FIG. 3 is a view showing an example of an image of, e.g., a form in alphabet-using countries fetched by, e.g., a scanner. FIG. 4 is a view showing an example of word candidates detected from the image fetched by, e.g., the scanner. FIG. 5 is a view showing an example of a word dictionary having city name words registered therein. In this case, such word candidates as shown in the image in FIG. 4 are detected from the image in FIG. 3, these word candidates are searched for words registered in the word dictionary (e.g., city names registered in the word dictionary in FIG. 5), and words written in the form or the like (e.g., city names) are specified. At this time, predetermined correction processing is performed with respect to a result of matching processing for the word candidates and the words in the word dictionary in this embodiment in particular.

Figure 6:
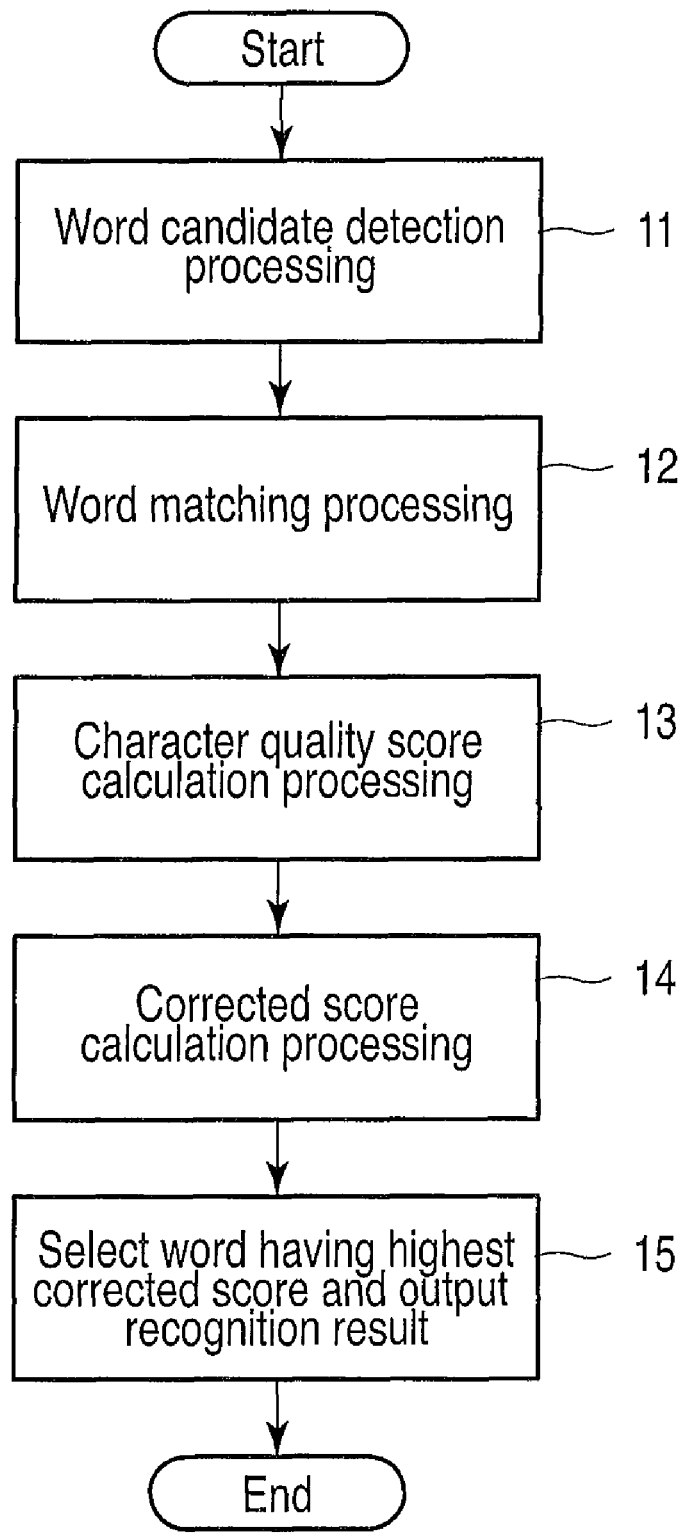
FIG. 6 is a flowchart for explaining the word recognition method including correction processing.

Here, the word recognition method including the correction processing according to this embodiment will now be explained with reference to a flowchart in FIG. 6.

When such an image of, e.g., a form as depicted in FIG. 3 is fetched through, e.g., a scanner, each word candidate included in the image is detected as shown in FIG. 4 (step 11). A serial number is given to each detected word candidate.

Word matching processing for each word candidate is carried out (step 12). The word matching processing is processing of collating each word candidate with a plurality of words in the word dictionary to calculate, every word, a matching score indicative of a degree that the word candidate matches with a word in the dictionary.

A known technology called DP (Dynamic Programming) matching (or "dynamic planning method") can be applied to this word matching processing. This DP matching is well known as an algorithm that minimizes computational processing of calculating, e.g., a degree of similarity when collating objects (e.g., words) having different element numbers (e.g., character numbers), and it performs association between elements (alignment) while considering, e.g., a deviance of the elements to realize optimum collating processing. Availing this technology enables realizing, e.g., an improvement in a speed of the matching processing.

Matching scores calculated by the word matching processing are stored in a matching score table. FIG. 7 is a view showing an example of matching scores stored in the matching score table. This matching score table stores matching scores, every word, as matching processing results of respective word candidates having serial numbers 1 to 7 and city name words "STOCKHOLM", "TOCHICA", "MOHEDA", . . . in the word dictionary.

"TOSHIBA" indicative of a town name is written in an actual form as the word candidate having the serial number 3, and it can be expected that its matching score with respect to each city name word in the word dictionary becomes low. However, the word dictionary has a city name word "TOCHICA" in which five characters, match with "TOSHIBA" and two characters are different from the same. Since each character constituting "TOSHIBA" is fairly written in the form, a matching score (reference character a) with respect to the city name word "TOCHICA" in the word dictionary becomes high because of the matching five characters.

On the other hand, "StockHolm" indicative of a city name is written in the actual form as the word candidate having the serial number 6, and it can be expected that its matching score with respect to a city name word "STOCKHOLM" in the word dictionary becomes high. However, "STOCKHOLM" is disorderly written in the form, its matching score (reference numeral b) is not that high as expected.

At this time, the matching score denoted by reference numeral a is higher than the matching score designated by reference numeral b, and hence "TOSHIBA" written in the form may be possibly erroneously recognized as the city name word "TOCHICA". This embodiment avoids this erroneous recognition based on the following respective steps.

After the word matching processing, character quality score calculation processing for each word candidate is carried out (step 13). This character quality score calculation processing is processing of calculating a character quality score indicative of a degree that each character constituting each word candidate matches with an arbitrary character (any character in alphabets in the character dictionary). For example, when calculating a quality score of a given character candidate in a given word candidate, a probability (or a degree of similarity) that this character candidate matches with any one of alphabets in the character dictionary is calculated. A result of addition of individual quality scores acquired by performing such calculation processing with respect to each character candidate is adopted as a character quality score of this word candidate.

In this character quality score calculation processing, the above-explained DP matching can be likewise applied when performing the character candidate matching processing.

The character quality scores calculated by the character quality score calculation processing are stored in a character quality score table. FIG. 8 is a view showing an example of character quality scores stored in the character quality score table. This character quality score table stores character quality scores with respect to the word candidates having the serial numbers 1 to 7.

For example, in the word candidate having the serial number 3 or the word candidate having the serial number 7 written in the form, each character is fairly written. In particular, since a boundary between characters is clear, each character can be specified without fail. Since a shape of each character to be specified substantially matches with an arbitrary alphabet in the word dictionary, a character quality score of such a candidate is higher than those of other candidates. For example, in case of the word candidate "TOSHIBA" having the serial number 3, hand-written characters "T", "O", "S", "H", "I", "B", and "A" are fair so that they substantially match with alphabets "T", "O", "S", "H", "I", "B", and "A" in the character dictionary (a degree that these characters match with or similar to these alphabets is high), and hence a high score is given. In case of the word candidate having the serial number 7, a high score is likewise given.

On the other hand, in the word candidate having the serial number 4 or the word candidate having the serial number 6 written in the form, each character is disorderly written in a running hand. In particular, since a boundary between characters is unclear, specifying each character is difficult, and each character is apt to be erroneously specified. Even if each character can be correctly specified, it is often the case that a shape of each character does not substantially match with an arbitrary alphabet in the character dictionary. Therefore, such a word candidate has a lower character quality score than those of the other candidates. For example, the disorderly written word candidate "StockHolm" having the serial number 6 corresponds to this case, and it has a low score. The word candidate having the serial number 4 likewise has a low score.

After the character quality score calculation processing, corrected score calculation processing with respect to each word candidate is executed (step 14). The corrected score calculation processing is processing of correcting the matching scores obtained by the word matching processing based on the character quality scores acquired by the character quality score calculation processing. For example, processing of subtracting a character quality score obtained by the character quality score calculation processing from a matching score acquired by the word matching processing. As a result, a matching score of a word candidate having fairly written characters is greatly reduced by the correction processing and, on the other hand, a matching score of a word candidate having disorderly written characters is slightly reduced by the correction processing.

Corrected scores calculated by the corrected score calculation processing are stored in a corrected score table. FIG. 9 is a view showing an example of corrected scores stored in the corrected score table. This corrected score table stores corrected scores of respective words as a result of correcting matching scores which are matching processing results of the respective word candidates having the serial numbers 1 to 7 and the city name words "STOCKHOLM", "TOCHICA", "MOHEDA", . . . in the word dictionary.

At a point in time where the word matching processing is executed, the matching score (reference character a) of the word candidate having the serial number 3 and the word "TOCHICA" in the dictionary is higher than the matching score (reference character b) of the word candidate having the serial number 6 and the word "STOCKHOLM" in the dictionary, but levels of the scores are reversed after the corrected score calculation processing. That is, after the corrected score calculation processing, the matching score (the corrected score) (reference character b') of the word candidate having the serial number 6 and the word "STOCKHOLM" in the dictionary is higher than the matching score (the corrected score) (reference character a') of the word candidate having the serial number 3 and the word "TOCHICA" in the dictionary. As a result, obtaining a correct recognition result can be expected.

After the corrected score calculation processing, a city name word having the highest corrected score in the corrected score table is selected from the word dictionary, and the selected city name word is output as a recognition result (step 15).

Figure 10:
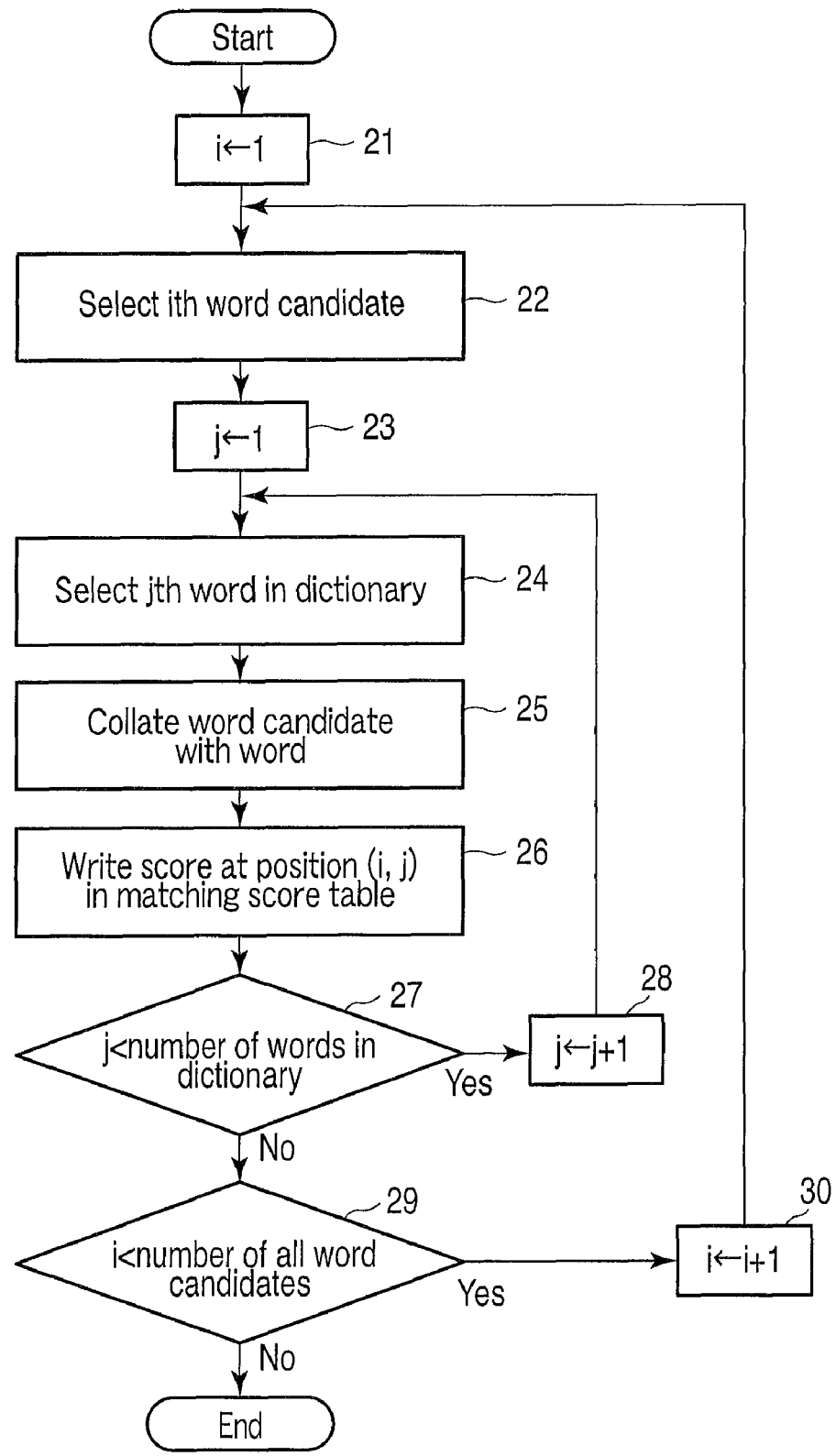
FIG. 10 is a flowchart for explaining details of word matching processing in FIG. 6.

Details of the word matching processing depicted in FIG. 6 will now be explained with reference to a flowchart in FIG. 10.

First, 1 is set to a number i of word candidates (step 21). Then, an ith word candidate is selected (step 22).

Subsequently, 1 is set to a number j of words in the word dictionary (step 23). Further, a jth word in the word dictionary is selected (step 24).

Then, matching processing with respect to the selected ith word candidate and jth word in the dictionary is executed to calculate a matching score (step 25). Furthermore, the matching score is written at a position (i, j) in the matching score table (step 26).

Here, j is compared with the number of all words in the dictionary (step 27). If j is smaller than the number of all words in the dictionary, 1 is added to j (step 28), and the processing from the step 24 is repeated. On the other hand, if j is not smaller, i is compared with the number of all word candidates (step 29). If i is smaller than the number of all word candidates, 1 is added to i (step 30), and the processing from the step 22 is repeated. On the other hand, if i is not smaller, the word matching processing is terminated.

Figure 11:
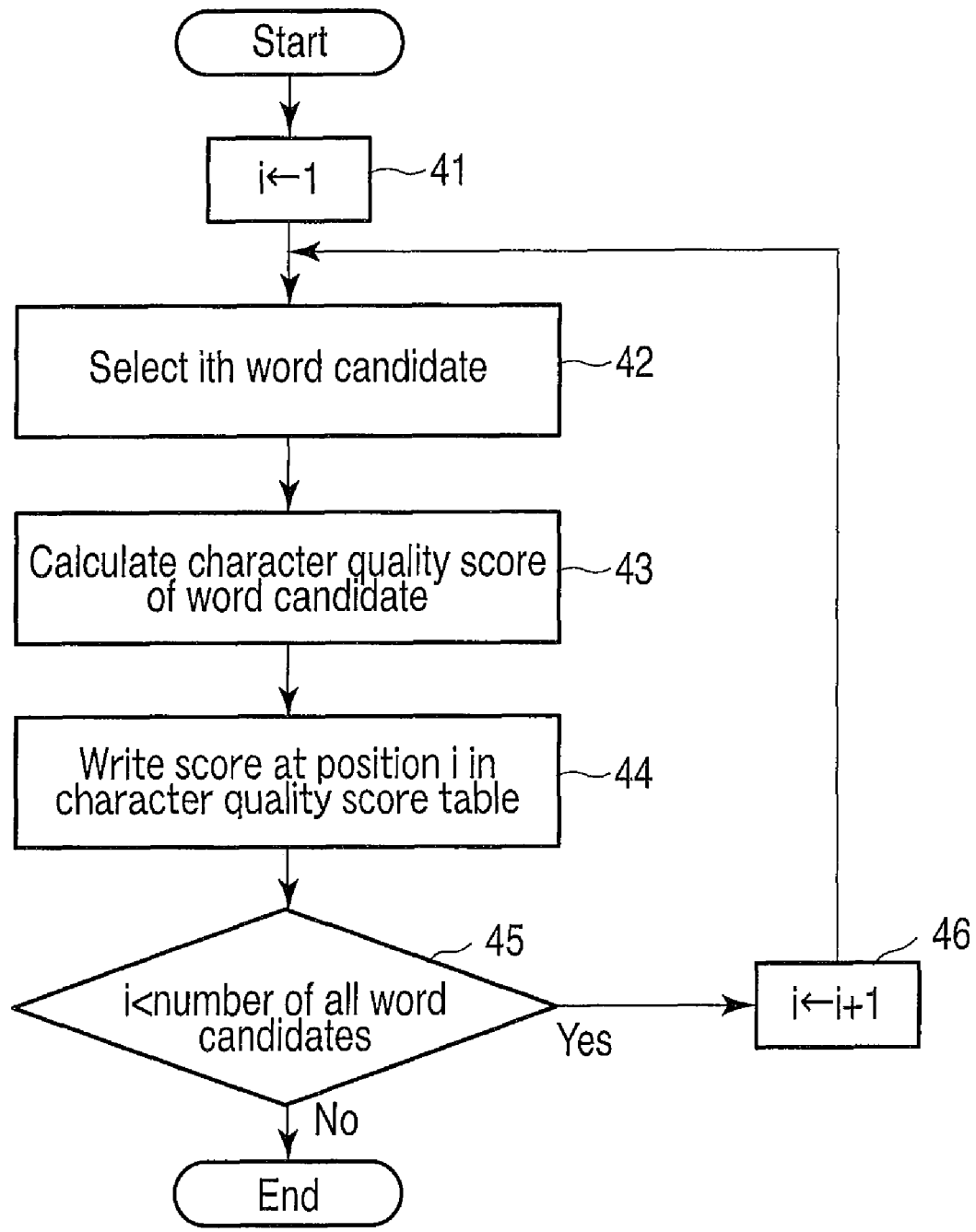
FIG. 11 is a flowchart for explaining details of word quality score calculation processing in FIG. 6.

Details of the character quality score calculation processing in FIG. 6 will now be explained with reference to a flowchart in FIG. 11.

First, 1 is set to a number i of word candidates (step 41). Moreover, an ith word candidate is selected (step 42).

Then, a character quality score of character candidates constituting the word candidate is calculated (step 43). Additionally, the character quality score is written at a position i in the character quality score table (step 44).

Subsequently, i is compared with the number of all word candidates (step 45). If i is smaller than the number of all word candidates, 1 is added to i (step 46), and the processing from the step 42 is repeated. On the other hand, if i is not smaller, the character quality score calculation processing is terminated.

Figure 12:
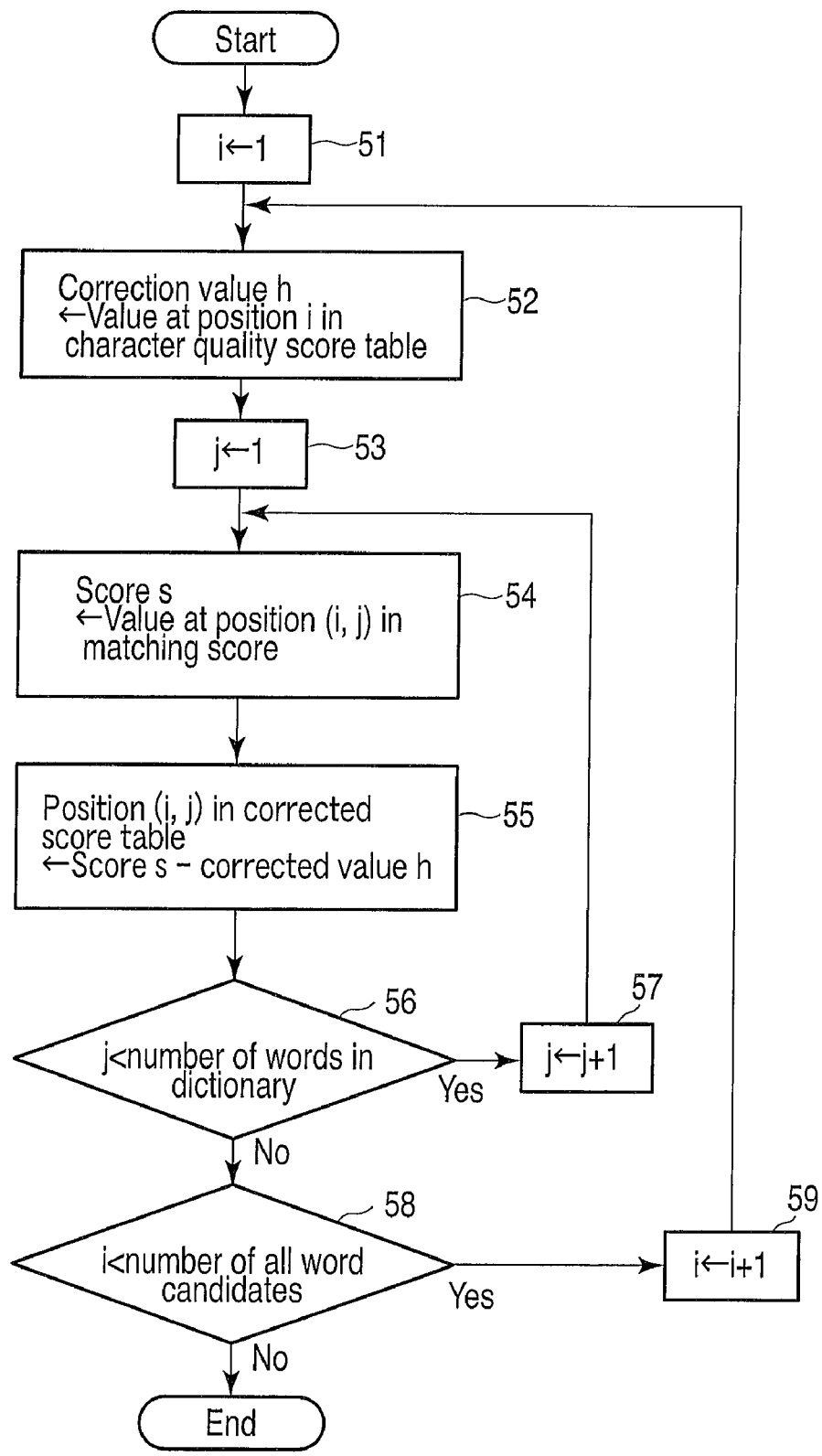
FIG. 12 is a flowchart for explaining details of corrected score calculation processing in FIG. 6.

Details of the corrected score calculation processing in FIG. 6 will now be explained with reference to a flowchart in FIG. 12.

First, 1 is set to a number i of word candidates (step 51). Further, a value at the position i in the character quality score table is read as a correction value h (step 52).

Then, 1 is set to a number j of words in the word dictionary (step 53). Furthermore, a value at the position (i, j) in the matching score table is read as a score s (step 54). Moreover, the correction value h is subtracted from the score s, and a calculation result is written at a position (i, j) in the corrected score table (step 55).

Subsequently, j is compared with the number of all words in the dictionary (step 56). If j is smaller than the number of all words in the dictionary, 1 is added to j (step 57), and the processing from the step 54 is repeated. On the other hand, if j is not smaller, i is compared with the number of all word candidates (step 58). If i is smaller than the number of all word candidates, 1 is added to i (step 59), and the processing from the step 52 is repeated. On the other hand, if i is not smaller, the corrected score calculation processing is terminated.

Then, specific examples of computational expressions that are used to calculate the various kinds of scores will now be explained.

Here, a word in the word dictionary, a character recognition result of all character candidates, a universal set of positions of a character candidate, and a universal set of paths from a left end to a right end of a given position are defined as follows, respectively.

Word in the dictionary: $w_i = c_{i1}, c_{i2}, \ldots$ ), $c_{ij} \epsilon C$ (C is a set of alphabets)

Character recognition result of all character candidates: $r = (r_1, r_2, \ldots)$ Universal set of positions: $L \epsilon \mathcal{L}$ Universal set of paths from a left end to a right end of a position L: $n \epsilon N$ To calculate a matching score of a given word candidate and a given word in the dictionary, a calculation using a posteriori probability ratio is performed. In this case, as a basic computational expression, the following Expression (1) is adopted, for example.

$$\log \frac{P(w_i \mid r)}{P(w_i)} \cong \sum_i \log \frac{P(r_i \mid c_{ij})}{P(r_i)} \quad \text{Expression (1)}$$

A numerator of a fractional part on a left-hand side in Expression 1 corresponds to a posteriori probability, and a denominator of the same corresponds to a priori probability.

To calculate a matching score (corresponding to the score table in FIG. 7) in the word matching processing based on Expression (1), the following Expression (2) is used.

$$\text{match}(L, w_i) \equiv \max_{n \in N} \left[ \prod_j \{P(r_{n_j} \mid c_{ij})/P(r_{n_j})\} \right] \quad \text{Expression (2)}$$

Further, to calculate a character quality score (corresponding to the score table in FIG. 8) in the character quality score calculation processing, the following Expression (3) is used.

$$\text{match}(L, C^*) \equiv \max_{n \in N} \left[ \prod_j \{P(r_{n_j} \mid C)/P(r_{n_j})\} \right] \quad \text{Expression (3)}$$

where, "$C^*$" in Expression (3) is indicative of an arbitrary alphabet.

At last, to calculate a maximum value of a corrected score (corresponding to the score table in FIG. 9) in the corrected score calculation processing, the following Expression (4) is used as an evaluation function.

$$\text{value}(w_i) \equiv P(w_i) \max_{L \in \mathcal{L}} \{\text{match}(L, w_i)/\text{match}(L, C^*)\} \quad \text{Expression (4)}$$

According to the foregoing embodiment, even if a position where a word is written is unknown, word recognition can be accurately performed. For example, even if a correct word is disorderly written and an incorrect word is fairly written, a matching score is corrected, and an appropriate evaluation value can be obtained, thereby avoiding occurrence of erroneous recognition.

It is to be noted that the present invention is not restricted to the foregoing embodiment as it is, and constituent elements can be modified and embodied on an embodying stage without departing from the scope of the invention. Furthermore, various inventions can be formed based on appropriate combinations of a plurality of constituent elements disclosed in the foregoing embodiment. For example, some constituent elements can be eliminated from all constituent elements disclosed in the embodiment. Moreover, constituent elements in different embodiments can be appropriately combined.

According to the present invention, when performing word recognition in, e.g., an optical character reading apparatus that optically reads a word formed of a plurality of characters written in a reading material, word recognition can be accurately performed even if a position where the word is written is unknown.

What is claimed is:

1. A word recognition method of performing recognition processing with respect to each word candidate obtained by reading characters in character information written in a reading material, comprising:
   a matching processing step of collating each word candidate with a plurality of words in a word dictionary and calculating, every word, a matching score indicative of a degree that each word candidate matches with a word;
   a character quality score calculating step of calculating a character quality score indicative of a degree that a character candidate constituting each word candidate matches with an arbitrary character; and
   a correcting step of correcting a matching score obtained at the matching processing step based on a character quality score acquired at the character quality score calculating step,
   wherein the correcting step includes processing by subtracting the character quality score obtained at the character quality score calculating step from the matching score acquired at the matching processing step.

2. The method according to claim 1, wherein the arbitrary character is one of alphabetical letters.

3. The method according to claim 1, further comprising a step of outputting a word having the highest matching score in respective matching scores corrected at the correcting step as a recognition result.

4. A non-transitory computer-readable medium storing a word recognition program that allows a computer to perform recognition processing with respect to a word candidate obtained by reading characters in character information written in a reading material, the program comprising:

a matching processing step of collating each word candidate with a plurality of words in a word dictionary and calculating, every word, a matching score indicative of a degree that each word candidate matches with a word;

a character quality score calculating step of calculating a character quality score indicative of a degree that a character candidate constituting each word candidate matches with an arbitrary character; and a correcting step of correcting a matching score obtained at the matching processing step based on a character quality score acquired at the character quality score calculating step, wherein the correcting step includes processing by subtracting the character quality score obtained at the character quality score calculating step from the matching score acquired at the matching processing step.

* * * * *